US011429449B2

(12) United States Patent
An et al.

(10) Patent No.: US 11,429,449 B2
(45) Date of Patent: Aug. 30, 2022

(54) METHOD FOR FAST SCHEDULING FOR BALANCED RESOURCE ALLOCATION IN DISTRIBUTED AND COLLABORATIVE CONTAINER PLATFORM ENVIRONMENT

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

(*) Notice: Subject to any disclaimer, the term of this patent is extended or adjusted under 35 U.S.C. 154(b) by 35 days.

(21) Appl. No.: 17/082,798

(22) Filed: Oct. 28, 2020

(65) Prior Publication Data
US 2021/0149737 A1 May 20, 2021

(30) Foreign Application Priority Data
Nov. 14, 2019 (KR) .................. 10-2019-0145665

(51) Int. Cl.
*G06F 9/50* (2006.01)
*G06F 11/34* (2006.01)

(52) U.S. Cl.
CPC .......... *G06F 9/5038* (2013.01); *G06F 9/5072* (2013.01); *G06F 9/5077* (2013.01);
(Continued)

(58) Field of Classification Search
CPC .... G06F 9/5038; G06F 9/5072; G06F 9/5077; G06F 11/3433; G06F 2209/503;
(Continued)

(56) References Cited

U.S. PATENT DOCUMENTS

2012/0291133 A1* 11/2012 Nagpal .............. G06F 21/6218
726/26
2013/0151535 A1* 6/2013 Dusberger .......... G06F 16/2272
707/E17.049

(Continued)

FOREIGN PATENT DOCUMENTS

| KR | 10-2019-0056624 A | 5/2019 |
| KR | 10-1987661 B1 | 6/2019 |

OTHER PUBLICATIONS

Korean Office Action dated Aug. 5, 2020 in counterpart Korean Patent Application No. 10-2019-0145665 (4 pages in English, 5 pages in Korean).

*Primary Examiner* — Sisley N Kim
(74) *Attorney, Agent, or Firm* — NSIP Law (57) ABSTRACT

A cloud management method and a cloud management device are provided. The cloud management method receives a resource allocation request for a specific service, calculates an idle resource current state score regarding each resource of each node of each cluster by monitoring virtual resource usage current states of a plurality of nodes included in a plurality of clusters, and determines a node to allocate resources for executing the requested specific service, based on the calculated idle resource current state score. Accordingly, a score is given to a resource current state of an associated cluster, and a resource candidate group is selected in response to a service scheduling request, based on the score, and an optimal node is selected based on required resources necessary for the service.

19 Claims, 6 Drawing Sheets

(52) U.S. Cl.
CPC .... *G06F 11/3433* (2013.01); *G06F 2209/503* (2013.01); *G06F 2209/505* (2013.01); *G06F 2209/508* (2013.01)

(58) Field of Classification Search
CPC ......... G06F 2209/505; G06F 2209/508; G06F 11/3006; G06F 11/301; G06F 11/3024; G06F 9/505; G06F 9/5083
See application file for complete search history.

(56) References Cited

U.S. PATENT DOCUMENTS

2020/0019444 A1* 1/2020 Rao ................. G06F 9/5016
2020/0296220 A1* 9/2020 Passi ................ H04M 15/721

* cited by examiner

| Candidate Monitoring & Score ||||||||
|---------|-----------|-----|-----|---------|---------|--------|-------|
| Cluster | Node Name | CPU | Mem | Storage | Network | Secure | Total |
| Cluster 1 | Node1 | 14 | 77 | 32 | 6 | Low | 129L |
| Cluster 1 | Node2 | 53 | 21 | 44 | 68 | Low | 186L |
| Cluster 2 | Node3 | 17 | 22 | 30 | 47 | High | 116H |
| Cluster 2 | Node4 | 66 | 88 | 87 | 2 | Low | 243L |

METHOD FOR FAST SCHEDULING FOR BALANCED RESOURCE ALLOCATION IN DISTRIBUTED AND COLLABORATIVE CONTAINER PLATFORM ENVIRONMENT

CROSS-REFERENCE TO RELATED APPLICATION(S) AND CLAIM OF PRIORITY

This application is based on and claims priority under 35 U.S.C. § 119 to Korean Patent Application No. 10-2019-0145665, filed on Nov. 14, 2019, in the Korean Intellectual Property Office, the disclosure of which is herein incorporated by reference in its entirety.

BACKGROUND

Field

The present disclosure relates generally to a method and a device for managing a cloud, and more particularly, to a cloud management device and a cloud management method for scheduling service resources in a cloud platform environment.

Description of Related Art

The features described in this section only provide background information regarding present embodiments, and do not constitute related-art technology.

The proportion of using a cloud environment rather than establishing an on-premise server environment when applications are developed and services are provided is increasing recently. However, there is no change in constraints of an operating system and a platform in executing various application in the cloud environment, and there still remain the problems of a slow development process and inflexible development and distribution methods of applications.

In addition, container-based micro services, which are capable of effectively using internal resources, and distributing and managing applications promptly on a second basis, have come to the market, but the container-based micro services have a limit to scaling out resources in response to increasing traffic of users.

Such a micro service does not allow mobility of services between container platforms, and has problems that it is difficult to flexibly scale out resources and to maximize mobility of services as collaboration between container platforms which flexibly provide extension and availability of services and are distributed geographically is needed.

To solve the above-mentioned problems, distributed and collaborative container platform technology has appeared, but there are still problems since resources are processed by sequential allocation of Round Robin scheduling other than scheduling for balanced resource allocation.

Accordingly, there is a demand for a method for balanced resource allocation in a large-scale distributed and collaborative container environment of a cloud.

SUMMARY

To address the above-discussed deficiencies of the prior art, it is a primary object of the present disclosure to provide a cloud management method and a cloud management device, which receive a resource allocation request for a specific service, calculate an idle resource current state score regarding each resource of each node of each cluster by monitoring virtual resource usage current states of a plurality of nodes included in a plurality of clusters; and determine a node to allocate resources for executing the requested specific service, based on the calculated idle resource current state score.

The technical objects to be achieved by the present disclosure are not limited to those mentioned in the above, and other technical objects that are not mentioned herein could be clearly understood by a person skilled in the art based on the following descriptions.

According to an embodiment of the present disclosure to achieve the above described object, a cloud management method by a cloud management device in a cloud platform environment includes: receiving a resource allocation request for a specific service; calculating an idle resource current state score regarding each resource of each node of each cluster by monitoring virtual resource usage current states of a plurality of nodes included in a plurality of clusters; and determining a node to allocate resources for executing the requested specific service, based on the calculated idle resource current state score.

In addition, calculating the idle resource current state score may include calculating by considering an idle CPU percentage, an idle memory percentage, an idle storage percentage, and an idle network percentage.

In addition, determining may include determining the node to allocate the resources for executing the requested specific service, by additionally considering a level of security.

In addition, determining may include determining the node to allocate the resources for executing the requested specific service, by additionally considering a number of times of occurrence of fault.

In addition, determining may include giving weights to the idle CPU percentage, the idle memory percentage, the idle storage percentage, the idle network percentage, the level of security, and the number of times of occurrence of fault, respectively, and determining the node to allocate the resources for executing the requested specific service, by additionally considering the weights.

In addition, the respective clusters may be positioned in different regions, and determining may include determining the node to allocate the resources for executing the requested specific service by additionally considering the regions of the respective clusters.

In addition, determining may include determining a node that has a highest idle resource current state score from among nodes of a cluster that satisfies a predetermined security condition by the requested specific service and exists in a predetermined region, as the node to allocate the resources for executing the requested specific service.

In addition, determining may include, when there does not exist a nod that contains the resources for executing the requested specific service, determining two or more nodes as the node to allocate the resources for executing the requested specific service.

In addition, determining may include determining two or more nodes in one cluster as the node to allocate the resources for executing the requested specific service.

According to an embodiment of the present disclosure, there is a provided a computer readable recording medium having a computer program recorded thereon for executing a cloud management method by a cloud management device in a cloud platform environment, the method including: receiving a resource allocation request for a specific service; calculating an idle resource current state score regarding each resource of each node of each cluster by monitoring virtual resource usage current states of a plurality of nodes included in a plurality of clusters; and determining a node to allocate resources for executing the requested specific service, based on the calculated idle resource current state score.

According to an embodiment of the present disclosure, a cloud management device includes: a communication unit configured to receive a resource allocation request for a specific service; and a controller configured to calculate an idle resource current state score regarding each resource of each node of each cluster by monitoring virtual resource usage current states of a plurality of nodes included in a plurality of clusters, and to determine a node to allocate resources for executing the requested specific service, based on the calculated idle resource current state score.

According to an embodiment of the present disclosure, a cloud system includes: a cloud management device configured to receive a resource allocation request for a specific service, to calculate an idle resource current state score regarding each resource of each node of each cluster by monitoring virtual resource usage current states of a plurality of nodes included in a plurality of clusters, and to determine a node to allocate resources for executing the requested specific service, based on the calculated idle resource current state score; and a cloud platform configured to allocate the resources for executing the specific service to the determined node.

According to various embodiments of the present disclosure, there are provided a cloud management method and a cloud management device, which receive a resource allocation request for a specific service, calculate an idle resource current state score regarding each resource of each node of each cluster by monitoring virtual resource usage current states of a plurality of nodes included in a plurality of clusters; and determine a node to allocate resources for executing the requested specific service, based on the calculated idle resource current state score. Accordingly, a score may be given to a resource current state of an associated cluster, and a resource candidate group can be selected in response to a service scheduling request, based on the score, and an optimal node can be selected based on required resources necessary for the service.

The effects that can be achieved by the present disclosure are not limited to those mentioned in the above, and other effects that are not mentioned herein could be clearly understood by a person skilled in the art based on the following descriptions.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The present disclosure will now be described more fully with reference to specific embodiments of the present disclosure illustrated in the accompanying drawings to clarify features and advantages of the present disclosure.

In the following description and the accompanying drawings, well-known functions or constructions are not described in detail since they would obscure the invention in unnecessary detail. In addition, it should be noted that, throughout the drawings, the same reference numerals are used for the same elements if possible.

Terms or words used in the following description and drawings should not be interpreted as being limited to general and dictionary definition, and should be interpreted as having definitions and concepts suitable for the technical idea of the present disclosure, based on the principle that the inventors can appropriately define the terms as concepts for explaining their invention in the best method.

Accordingly, the constructions illustrated in the embodiments of the detailed description and the drawings are merely the most preferred embodiment of the present disclosure, and do not represent all technical ideas of the present disclosure. Therefore, the embodiments should be construed as including various equivalents and variations substituted therefor at the time of filing.

The terms such as "first" or "second" used in various embodiments may be used to explain various elements and to distinguish one element from another element, but do not limit the elements. For example, without departing from the scope of the present disclosure, a second element may be referred to as a first element, and similarly, a first element may be referred to as a second element.

It will be understood that when an element is referred to as being "coupled to" or "connected to" another element, it can be logically or physically coupled or connected to another element.

In other words, an element may be directly coupled or connected to another element, but there may be an intervening element therebetween or the element may be indirectly coupled or connected to another element.

The terms "include" or "have" used in the detailed description indicate the presence of features, numbers, steps, operations, elements, components or a combination thereof described in the detailed description, and do not preclude the presence or addition of one or more other features, numbers, steps, operations, elements, components, or a combination thereof.

The terms "unit" and "module" and the terms having suffix "-er" or "-or" used in the detailed description refer to a unit for processing at least one function or operation, and may be implemented by hardware, software, or a combination of hardware and software.

As used herein, the terms "a", "an," "one," "the," and similar terms thereto are intended to include the singular forms and the plural forms, unless the context describing the present disclosure (in particular, the context of claims presented below) clearly indicates otherwise.

Hereinafter, the present disclosure will be described in detail with reference to the accompanying drawings.

Figure 1:
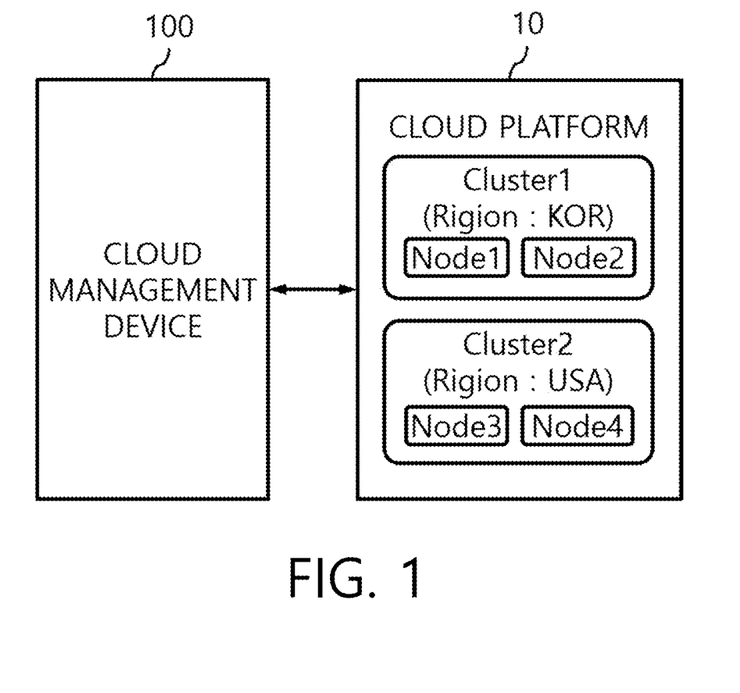
FIG. 1 is a view illustrating a configuration of a cloud system according to an embodiment of the present disclosure.

FIG. 1 is a view illustrating a configuration of a cloud system according to an embodiment of the present disclosure. As shown in FIG. 1, in the cloud system, a cloud platform 10 is managed by a cloud management device 100. Specifically, the cloud management device 100 receives a resource allocation request for a specific service, calculates an idle resource current state score regarding each resource of each node of each cluster by monitoring virtual resource usage current states of a plurality of nodes included in a plurality of clusters, and determines a node to allocate resources for executing the requested specific request, based on the calculated idle resource current state scores.

The cloud management device 100 may be implemented by a physically independent device, may be implemented in an integrated form as a part of a certain device, system, or cloud, or may be implemented in the form of software like a program, a platform, a framework, or an application installed in a smartphone, a computer, a server, or a cloud. In addition, respective components of the cloud management device 100 may be implemented by physical components or may be implemented by components in the form of functions of software.

The cloud platform 10 may be a platform that includes a plurality of servers and provides cloud services through virtualization, and may be implemented by Docker and Kubernetes, etc., and may be established as a distributed and collaborative container platform environment.

As shown in FIG. 1, the cloud platform 10 may include a plurality of clusters, and a plurality of nodes are included in one cluster. At least one pod may be included in the node.

Herein, the cluster is a virtualized environment that makes various servers seem like one server, and may be positioned on a regional basis. Specifically, the cloud platform 10 of FIG. 1 includes cluster 1 and cluster 2, and cluster 1 may be positioned in Korea and cluster 2 may be positioned in U.S.A.

In addition, it can be seen that one cluster includes a plurality of nodes. The node refers to a sever unit based on which a real service (or container) is executed. The node serves to create a service and to manage a service state, and may include a plurality of pods.

The cloud platform 10 structed as described above performs a function of allocating resources for executing a specific service to a node that is determined by the cloud management device 100.

In addition, the cloud management device 100 performs a function of a master of managing all clusters. All commands invoke an application programming interface (API) server of the cloud management device 100 which is the master, and a node performs a necessary operation while communicating with the cloud management device 100. When a command is for a container of a specific node or a log is inquired, a command is not directly transmitted to the node, but is transmitted to the cloud management device 100, and the cloud management device 100 accesses the node instead and replies with a result.

Figure 2:
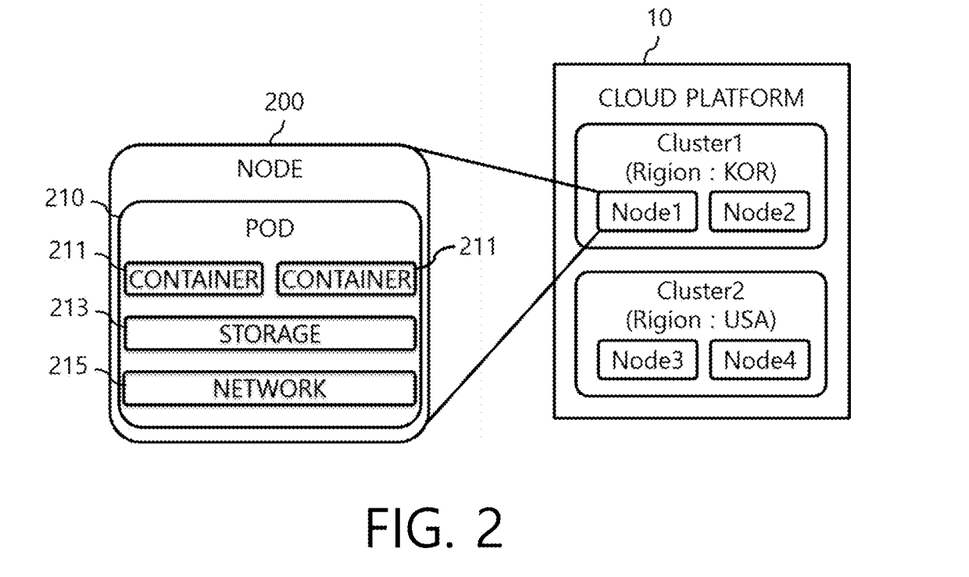
FIG. 2 is a view illustrating a detailed configuration of a cloud platform according to an embodiment of the present disclosure.

The node includes at least one pod, and a structure of the node will be described in detail below with reference to FIG. 2. FIG. 2 is a view illustrating a detailed configuration of the cloud platform 10 according to an embodiment.

As shown in FIG. 2, the cloud platform 10 includes a plurality of nodes 200, and the node 200 includes at least one pod 210.

The node 200 may create a necessary pod 210 and may set a network 215 and a storage 213 while communicating with the cloud management device 100.

The pod 210 is the smallest distribution unit, and is where real containers are created. The pod 210 is created and managed by a controller or a ReplicaSet, and may be extended to hundreds of pods or thousands of pods. The pods 210 may be labeled to define their respective using purposes (specialized for GPU, SSD server). The pod 210 is the smallest unit that can be distributed in Kubernetes, and has the attributes of one or more containers 211, the storage 213, and the network 215. At least one container 211 belonging to the pod 210 may share the storage 213 and the network 215, and may access a localhost.

The cloud platform 10 includes the plurality of clusters, the plurality of nodes, and the plurality of pods structured as described above.

Figure 3:
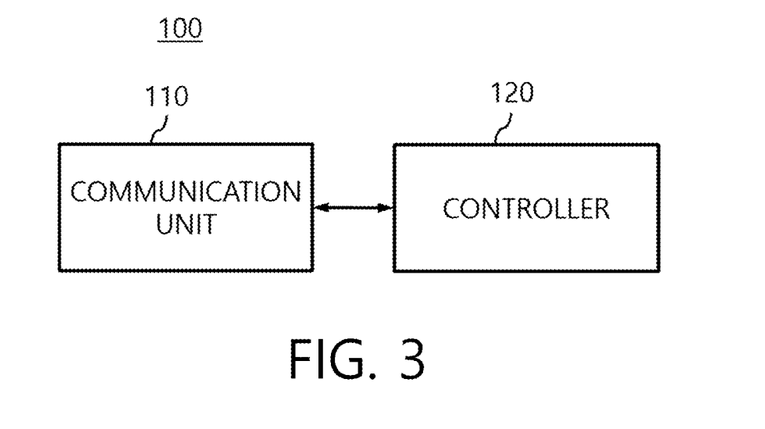
FIG. 3 is a view illustrating a cloud management device according to an embodiment of the present disclosure.

Hereinafter, a configuration of the cloud management device 100 will be described in detail with reference to FIG. 3. FIG. 3 is a view illustrating the cloud management device 100 according to an embodiment.

As shown in FIG. 3, the cloud management device 100 includes a communication unit 110 and a controller 120.

The communication unit 110 is connected to communicate with the cloud platform 10, and receives a resource allocation request for a specific service. Herein, the resource allocation request for the specific service includes information regarding resources, etc. necessary for the corresponding service, and specifically, the resource allocation request for the specific service may include at least one of API version information, type information, label information, an amount of CPU needed, an amount of memory needed, an amount of storage needed, policy information, a limit to the number of times of occurrence of fault, and regional information. In addition, the resource allocation request for the specific service may further include information regarding a weight of each type of resource.

The communication unit 110 may perform communication in various wireless communication methods, such as Bluetooth, WiFi, near field communication (NFC), cellular, long-term evolution (LTE), etc., and may perform communication through wired communication such as a wired local area network (LAN), etc.

The controller 120 controls overall operations of the cloud management device 100. Specifically, the controller 120 may calculate an idle resource current state score regarding each resource of each node of each cluster, by monitoring virtual resource usage current states of a plurality of nodes included in a plurality of clusters, and may determine a node to allocate resources for executing the requested specific service, based on the calculated idle resource current state score.

Figure 4:
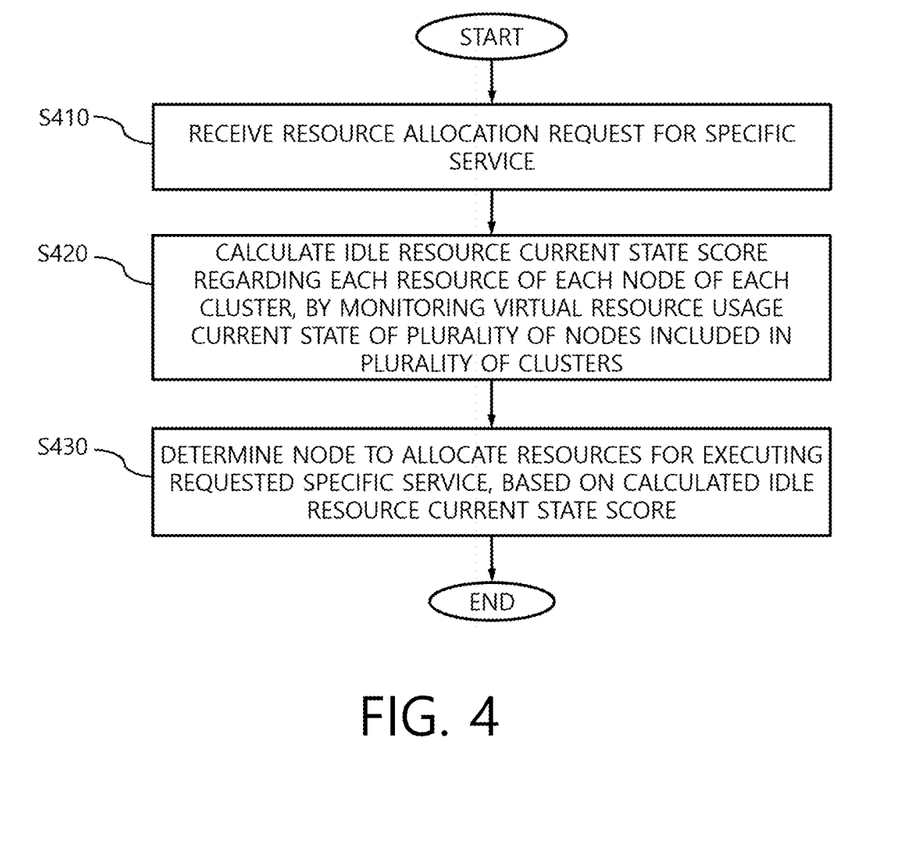
FIG. 4 is a flowchart provided to explain a cloud management method according to an embodiment of the present disclosure.

Other operations of the controller 120 will be described in detail with reference to FIG. 4. FIG. 4 is a flowchart provided to explain a cloud management method according to an embodiment.

First, the controller 120 receives a resource allocation request for a specific service (S410).

The controller 120 calculates an idle resource current state score regarding each resource of each node of each cluster, by monitoring virtual resource usage current states of a plurality of nodes included in a plurality of clusters (S420). Specifically, the controller 120 may calculate the idle resource current state score by considering an idle CPU percentage, an idle memory percentage, an idle storage percentage, and an idle network percentage. In addition, the controller 120 may additionally consider two levels of security, high and low. Specifically, the controller 120 may calculate a sum of all the idle CPU percentage, the idle memory percentage, the idle storage percentage, and the idle network percentage, as the idle resource current state score. In addition, the controller 120 may display the level of security after the idle resource current state score, and specifically, when the level of security is high, the controller 120 may display "H" after the idle resource current state score, and, when the level of security is low, the controller 120 may display "L" after the idle resource current state score.

Figure 5:
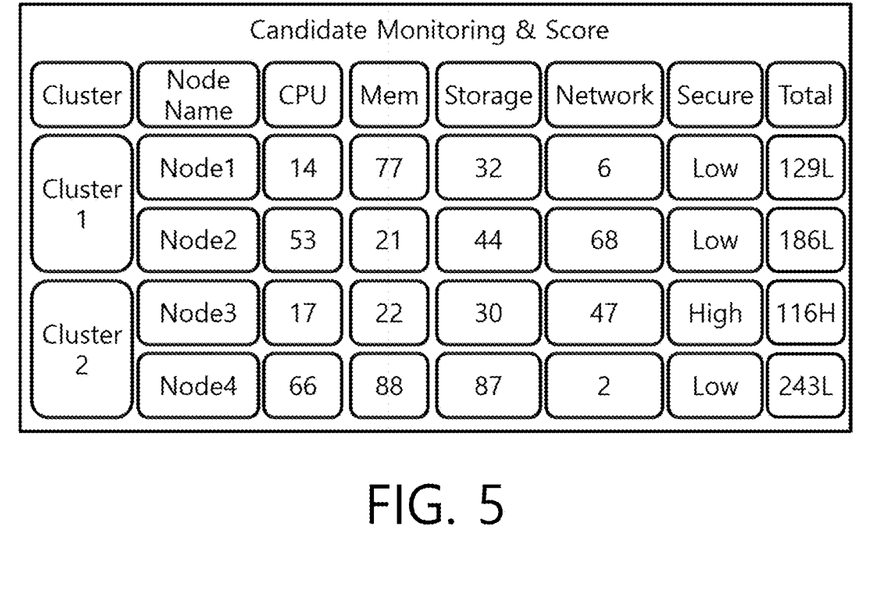
FIG. 5 is a view illustrating an example of idle resource current state scores according to an embodiment of the present disclosure.

A method of calculating an idle resource current state score will be described in detail with reference to FIG. 5. FIG. 5 is a view illustrating an example of idle resource current state scores according to an embodiment.

FIG. 5 is a table showing calculation of idle resource current state scores of node 1 and node 2 of cluster 1 and node 3 and node 4 of cluster 2. FIG. 5 shows an idle CPU percentage, an idle memory percentage, an idle storage percentage, an idle network percentage, and a level of security regarding each of nodes 1 to 4. In addition, the sum of all the idle CPU percentage, the idle memory percentage, the idle storage percentage, and the idle network percentage is calculated as an idle resource current state score, and "H" or "L" are displayed on the last according to a level of security.

In the case of FIG. 5, since node 4 has the highest idle resource current state score, the controller 120 may determine node 4 as a resource allocation node for a service unless there are some other conditions. However, when a resource allocation request for a specific service has a condition set to require a node of high security, the controller 120 may determine node 3 having high security as the resource allocation node for the service, although node 3 has the lowest idle resource current state score.

Referring back to FIG. 4, the controller 120 determines a node to allocate resources for executing the requested specific service, based on the calculated idle resource current state scores (S430). In this case, the controller 120 may determine the node to allocate the resources for executing the requested specific service, by additionally considering the level of security as described above.

In addition, the controller 120 may determine the node to allocate the resources for executing the requested specific service, by additionally considering the number of times of occurrence of fault. Specifically, the controller 120 may identify the number of times that a fault occurs in each node during a predetermined period, and may cross off a node in which a fault occurs a predetermined number of times or more from resource allocation targets. For example, the controller 120 may cross off a node in which a fault occurs 10 times or more for a month, from the resource allocation targets. The limit to the number of times of occurrence of fault may be set by a user, or may be included in the resource allocation request for the specific service.

In addition, the controller 120 may give weights to the idle CPU percentage, the idle memory percentage, the idle storage percentage, the idle network percentage, the level of security, and the number of times of occurrence of fault, and may determine the node to allocate the resources for executing the requested specific service by additionally considering the weights. Specifically, the controller 120 may calculate the idle resource current state scores by applying and adding different weights to the idle CPU percentage, the idle memory percentage, the idle storage percentage, and the idle network percentage, respectively. For example, when weight 1, weight 2, weight 3, and weight 4 are applied to the idle CPU percentage, the idle memory percentage, the idle storage percentage, and the idle network percentage, the idle resource current state score may be calculated as follows:

$$\text{Idle resource current state score} = (\text{idle CPU percentage} \ast \text{weight1}) + (\text{idle memory percentage} \ast \text{weight2}) + (\text{idle storage percentage} \ast \text{weight3}) + (\text{idle network percentage} \ast \text{weight4})$$

Figure 6:
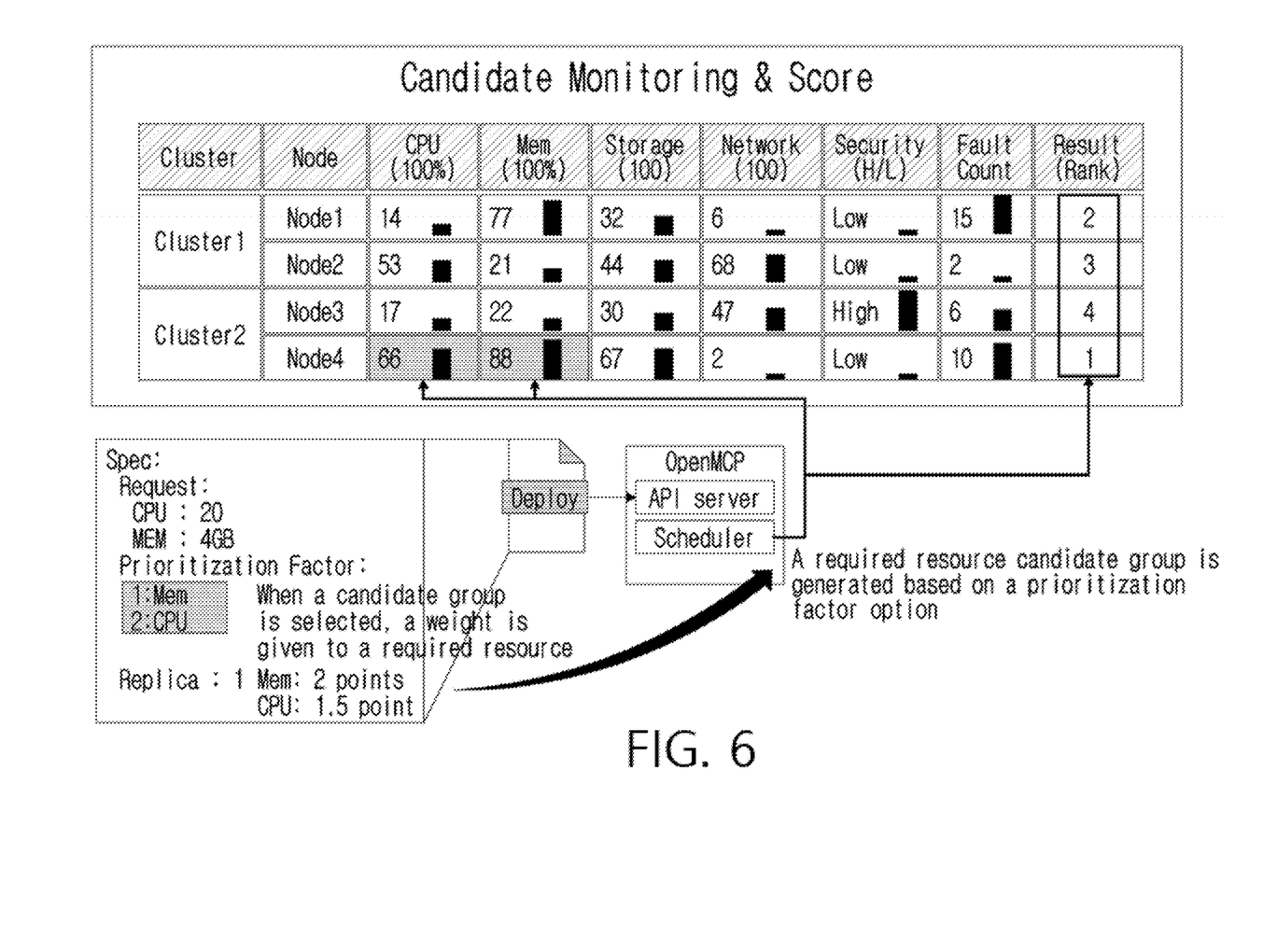
FIG. 6 is a view illustrating a process of selecting a node by applying idle resource current state scores and weights according to an embodiment of the present disclosure.

A method of applying weights will be described in detail with reference to FIG. 6. FIG. 6 is a view illustrating a process of selecting a node by applying idle resource current state scores and weights according to an embodiment.

In the case of FIG. 6, it can be seen that a resource allocation request includes a weight of 2 and a weight of 1.5 as weights for a memory and a CPU. In this case, the controller 120 may multiply the idle memory percentage by 2 and multiply the idle CPU percentage by 1.5, and then, may calculate an idle resource current state score by adding up all the idle CPU percentage to which the weight is applied, the idle memory percentage to which the weight is applied, the idle storage percentage, and the idle network percentage, and may rank the nodes accordingly. Through the above-described process, node 4 is determined as being ranked first, that is, as having the most resources, and accordingly, the controller 120 determines node 4 as the resource allocation node for the specific service.

The clusters may be positioned in different regions as described above, the controller 120 may determine the node to allocate the resources for executing the requested specific service, by additionally considering regions of the clusters. Specifically, the resource allocation request may include regional information, and the controller 120 may set only a cluster existing in a region corresponding to the regional information as the resource allocation target. For example, when a service is provided only in a specific region, using a cluster close to the region may be beneficial in light of speed or efficiency, and accordingly, the controller 120 may set only the cluster existing in the region corresponding to the regional information as the resource allocation target.

In addition, the controller 120 may set the cluster existing in the region corresponding to the regional information included in the resource allocation request to be crossed off from the resource allocation targets. When a service is not necessary in a specific region, the controller 120 may set a cluster existing in the region corresponding to the regional information to be crossed off from the resource allocation targets in order to set the cluster close to the region not to be used.

As described above, the controller 120 determines the node to allocate the resources for executing the specific service by considering various conditions. Specifically, the controller 120 may determine a node having the highest idle resource current state score from among nodes of a cluster that satisfies a predetermined security condition by the requested specific service and exists in a predetermined region, as the node to allocate the resources for executing the requested specific service, and may determine the node by additionally considering a regional condition.

When there does not exist a node that contains resources for executing the requested specific service, the controller 120 may determine two or more nodes as the node to allocate the resources for executing the requested specific service. In this case, the controller 120 may determine two or more nodes in one cluster as the node to allocate the resources for executing the requested specific service. When one service is distributed and is executed in different clusters, the speed or efficiency may be greatly reduced due to a regional distance or a network distance. Therefore, the controller 120 may select nodes in one cluster when determining two or more nodes as the resource allocation targets. This will be described in detail below with reference to FIG. 7.

Figure 7:
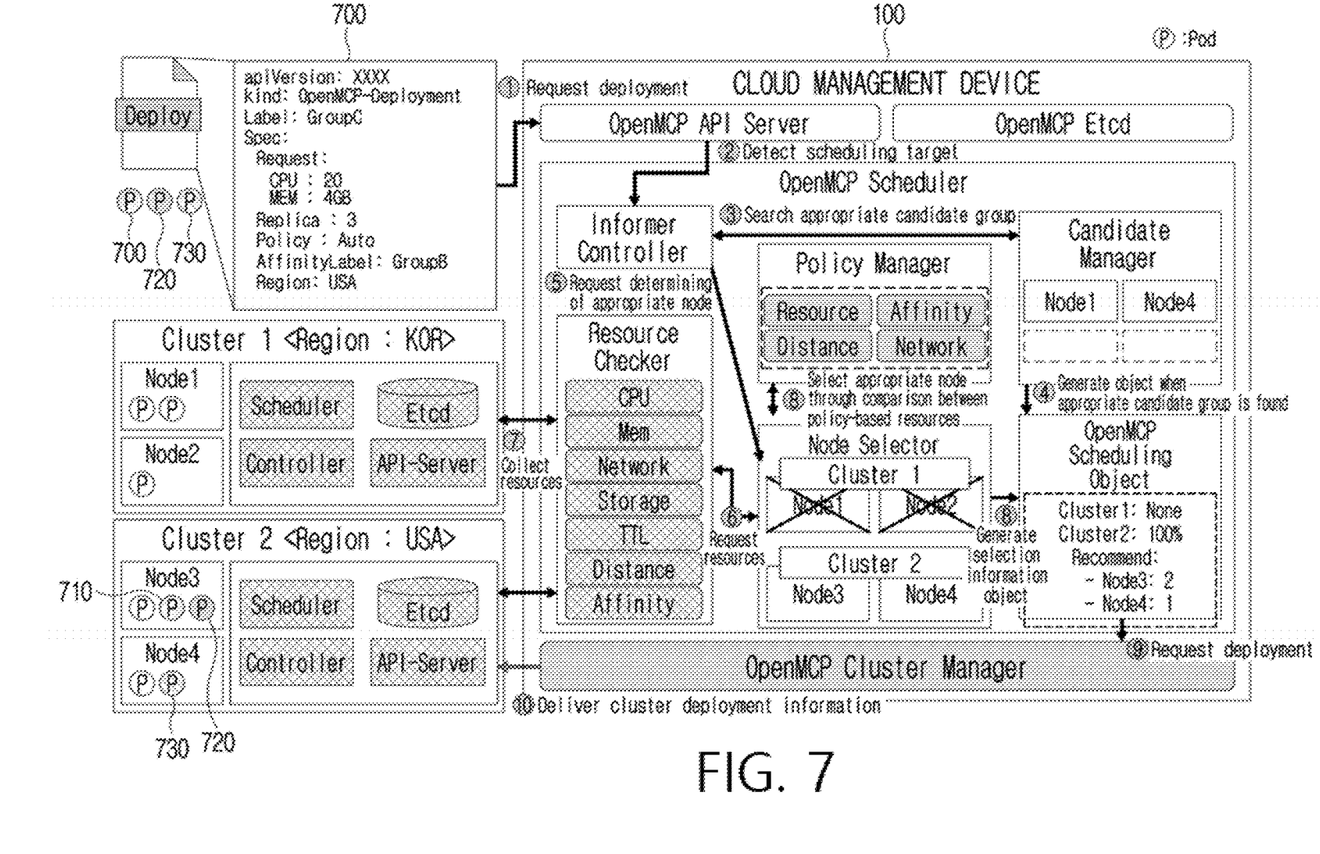
FIG. 7 is a view illustrating a process of processing a resource allocation request for a service according to an embodiment of the present disclosure.

FIG. 7 is a view illustrating a process of processing a resource allocation request for a service according to an embodiment.

As shown in FIG. 7, the cloud management device 100 may receive a resource allocation request 700 for executing a specific service, and may identify that corresponding resources are allocated to node 3 and node 4 of cluster 2.

Specifically, the resource allocation request 700 may indicate that three pods 710, 720, 730 need to be allocated, and it can be seen that two pods 710, 720 are allocated to node 3 and one pod 730 is allocated to node 4.

As described above, when there does not exist a node that contains resources for executing a requested specific service, the controller 120 may determine two or more nodes as a node to allocate resources for executing the requested specific service.

In addition, the cloud management device 100 may determine two or more nodes as the node to allocate the resources for executing the requested specific service through the detailed process shown in FIG. 7, and may allocate service resources to the determined nodes.

Through the above-described process, the cloud management device 100 may give a score regarding a resource current state of an associated cluster, and may select a resource candidate group in response to a service scheduling request, based on the score, and may select an optimal node based on required resources necessary for the service.

The technical idea of the present disclosure may be applied to a computer-readable recording medium which records a computer program for performing the function and the method of the apparatus according to the present embodiments. In addition, the technical idea according to various embodiments of the present disclosure may be implemented in the form of a programming language code recorded on the computer-readable recording medium and readable by a computer. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, a flash memory, a solid state disk (SSD), or the like. A code or program that is stored in the computer readable recording medium and readable by a computer may be transmitted via a network connected between computers.

Although the detailed description and drawings describe a configuration of an exemplary device, an implemented thing of an functional operation and a subject explained in the detailed description may be implemented by different types of digital electronic circuits, or may be implemented by computer software, firmware, or hardware including the structure disclosed in the detailed description and a structural equivalent thereto, or may be implemented by a combination of one or more of computer software, firmware, or hardware.

Accordingly, while exemplary embodiments have been particularly shown and described above, it will be understood by those of ordinary skill in the art that various changes in form and details may be made therein without departing from the spirit and scope.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A cloud management method by a cloud management device in a cloud platform environment, the method comprising:
   receiving a resource allocation request for a specific service, the resource allocation request including a requested limit to a number of times of occurrence of fault and information about a requested weight of each type of resource;
   calculating an idle resource current state score regarding each resource of each node of each cluster by monitoring virtual resource usage current states of a plurality of nodes included in a plurality of clusters; and
   determining a node to allocate resources for executing the requested specific service, based on the calculated idle resource current state score, using a result of applying the requested weight of each type of resource to each resource, of the resources.

2. The method of claim 1, wherein the calculating the idle resource current state score comprises calculating by considering an idle CPU percentage, an idle memory percentage, an idle storage percentage, and an idle network percentage.

3. The method of claim 2, wherein the determining comprises determining the node to allocate the resources for executing the requested specific service, by additionally considering a level of security.

4. The method of claim 3, wherein the determining comprises determining the node to allocate the resources for executing the requested specific service, by additionally considering the requested limit to the number of times of occurrence of fault.

5. The method of claim 4, wherein the determining comprises giving weights to the idle CPU percentage, the idle memory percentage, the idle storage percentage, the idle network percentage, the level of security, and the number of times of occurrence of fault, respectively, and determining the node to allocate the resources for executing the requested specific service, by additionally considering the weights.

6. The method of claim 5, wherein the respective clusters are positioned in different regions, and
wherein the determining comprises determining the node to allocate the resources for executing the requested specific service by additionally considering the regions of the respective clusters.

7. The method of claim 6, wherein the determining comprises determining a node that has a highest idle resource current state score from among nodes of a cluster that satisfies a predetermined security condition by the requested specific service and exists in a predetermined region, as the node to allocate the resources for executing the requested specific service.

8. The method of claim 1, wherein the determining comprises, when there does not exist a nod: that contains the resources for executing the requested specific service, determining two or more nodes as the node to allocate the resources for executing the requested specific service.

9. The method of claim 8, wherein the determining comprises determining two or more nodes in one cluster as the node to allocate the resources for executing the requested specific service.

10. A cloud management device comprising:
a communication processor configured to receive a resource allocation request for a specific service, the resource allocation request including a requested limit to a number of times of occurrence of fault and information about a requested weight of each type of resource; and
a controller processor configured to calculate an idle resource current state score regarding each resource of each node of each cluster by monitoring virtual resource usage current states of a plurality of nodes included in a plurality of clusters, and to determine a node to allocate resources for executing the requested specific service, based on the calculated idle resource current state score, using a result of applying the requested weight of each type of resource to each resource, of the resources.

11. The device of claim 10, wherein the calculating the idle resource current state score comprises calculating by considering an idle CPU percentage, an idle memory percentage, an idle storage percentage, and an idle network percentage.

12. The device of claim 11, wherein the determining comprises determining the node to allocate the resources for executing the requested specific service, by additionally considering a level of security.

13. The device of claim 12, wherein the determining comprises determining the node to allocate the resources for executing the requested specific service, by additionally considering the requested limit to the number of times of occurrence of fault.

14. The device of claim 13, wherein the determining comprises giving weights to the idle CPU percentage, the idle memory percentage, the idle storage percentage, the idle network percentage, the level of security, and the number of times of occurrence of fault, respectively, and determining the node to allocate the resources for executing the requested specific service, by additionally considering the weights.

15. The device of claim 14, wherein the respective clusters are positioned in different regions, and
wherein the determining comprises determining the node to allocate the resources for executing the requested specific service by additionally considering the regions of the respective clusters.

16. The device of claim 15, wherein the determining comprises determining a node that has a highest idle resource current state score from among nodes of a cluster that satisfies a predetermined security condition by the requested specific service and exists in a predetermined region, as the node to allocate the resources for executing the requested specific service.

17. The device of claim 10, wherein the determining comprises, when there does not exist a node that contains the resources for executing the requested specific service, determining two or more nodes as the node to allocate the resources for executing the requested specific service.

18. The device of claim 17, wherein the determining comprises determining two or more nodes in one cluster as the node to allocate the resources for executing the requested specific service.

19. A cloud system comprising:
a cloud management device configured to;
receive a resource allocation request for a specific service, the resource allocation request including a requested limit to a number of times of occurrence of fault and information about a requested weight of each type of resource;
calculate an idle resource current state score regarding each resource of each node of each cluster by monitoring virtual resource usage current states of a plurality of nodes included in a plurality of clusters; and
determine a node to allocate resources for executing the requested specific service, based on the calculated idle resource current state score, using a result of applying the requested weight of each type of resource to each resource of the resources; and
a cloud platform device configured to allocate the resources for executing the specific service to the determined node.

* * * * *